US00RE34609E

United States Patent [19]

Müeller

[11] E Patent Number: Re. 34,609

[45] Reissued Date of Patent: May 17, 1994

[54] COLLECTORLESS DIRECT CURRENT MOTOR, DRIVER CIRCUIT FOR A DRIVE AND METHOD OF OPERATING A COLLECTORLESS DIRECT CURRENT MOTOR

[75] Inventor: Rolf Müeller, Munich, Fed. Rep. of Germany

[73] Assignee: Papst Licensing GmbH, Spaichingen, Fed. Rep. of Germany

[21] Appl. No.: 654,493

[22] PCT Filed: Oct. 18, 1986

[86] PCT No.: PCT/DE86/00421

§ 371 Date: Jun. 22, 1987

§ 102(e) Date: Jun. 22, 1987

[87] PCT Pub. No.: WO87/02528

PCT Pub. Date: Apr. 23, 1987

Related U.S. Patent Documents

Reissue of:

[64] Patent No.: 4,804,892
Issued: Feb. 14, 1989
Appl. No.: 72,264
Filed: Jun. 22, 1987

[30] Foreign Application Priority Data

Oct. 21, 1985 [DE] Fed. Rep. of Germany ..... 3537403

[51] Int. Cl.[5] ..... H02P 6/02

[52] U.S. Cl. ..... 318/254; 318/472

[58] Field of Search ..... 318/138, 254, 439, 471, 318/472, 473, 599

[56] References Cited

U.S. PATENT DOCUMENTS

| | | | |
|---|---|---|---|
| 3,584,280 | 6/1971 | Inagaki et al. | 318/254 |
| 3,668,414 | 6/1972 | Norian et al. | 307/104 |
| 3,769,555 | 10/1973 | Dolbachian et al. | 318/138 |
| 3,906,320 | 9/1975 | Doemen . | |
| 3,986,086 | 10/1976 | Mueller . | |
| 3,988,652 | 10/1976 | Endo et al. | 318/254 |
| 4,097,788 | 6/1978 | Nygaard et al. | 318/138 X |
| 4,119,895 | 10/1978 | Mueller . | |
| 4,129,808 | 12/1978 | Bregeault et al. | 318/254 |
| 4,317,072 | 2/1982 | Goof et al. . | |
| 4,368,411 | 1/1983 | Kidd | 318/599 X |
| 4,393,339 | 7/1983 | Kimura | 318/254 |
| 4,429,262 | 1/1984 | Utenick | 318/254 |
| 4,472,666 | 9/1984 | Akeda et al. | 318/254 |
| 4,473,781 | 9/1984 | Nielsen | 318/138 |
| 4,494,052 | 1/1985 | Kelleher et al. . | |
| 4,507,591 | 3/1985 | Kelleher . | |
| 4,525,658 | 6/1985 | Yanagida . | |
| 4,535,275 | 8/1985 | Mueller . | |
| 4,544,868 | 10/1985 | Murty | 318/138 X |
| 4,546,293 | 10/1985 | Peterson et al. . | |
| 4,603,283 | 7/1986 | Oltendorf . | |
| 4,620,138 | 10/1986 | Mueller . | |
| 4,633,150 | 12/1986 | Inaji et al. | 318/138 X |
| 4,672,274 | 6/1987 | Suganuma . | |
| 4,698,563 | 10/1987 | Ban . | |
| 4,814,674 | 3/1989 | Hrassky . | |

FOREIGN PATENT DOCUMENTS

| | | |
|---|---|---|
| 0084156 | 7/1983 | European Pat. Off. . |
| 0190240 | 8/1986 | European Pat. Off. . |
| 0217599 | 4/1987 | European Pat. Off. . |
| 3044027A | 8/1981 | Fed. Rep. of Germany . |
| 2071939 | 9/1981 | United Kingdom . |

OTHER PUBLICATIONS

Angelo Alzati & Antonella Lanati, "Highly Efficient and Precise Brushless Drive System", 1985, SGS Microelectronica SpA, Italy.

Data sheet, "Bidirectional Three-Phase Brushless DC Driver", Dec. 1986, pp. 633-640, SGS, Italy.

Data sheet, "Three-Phase Brushless DC Motor Driver", Dec. 1986, p. 641 SGS, Italy.

*Primary Examiner*—Bentsu Ro

*Attorney, Agent, or Firm*—Finnegan, Henderson, Farabow, Garrett & Dunner

[57] ABSTRACT

A method for the low-loss regulation of a collectorless direct current motor and a semiconductor circuit has, during the commutation phase given by a position sensor and with reduced motor output and number of revolutions, transistors or one end transistor which initially operates temporarily as a switch and thereafter operates temporarily as an analog amplifier element. During the analog period, a current is available which changes slowly according to a ramp function.

39 Claims, 10 Drawing Sheets

COLLECTORLESS DIRECT CURRENT MOTOR, DRIVER CIRCUIT FOR A DRIVE AND METHOD OF OPERATING A COLLECTORLESS DIRECT CURRENT MOTOR

Matter enclosed in heavy brackets [ ] appears in the original patent but forms no part of this reissue specification; matter printed in italics indicates the additions made by reissue.

*REISSUE APPLICATION*

*This is an application for reissue of U.S. Pat. No. 4,804,892, issued Feb. 14, 1989 entitled "COLLECTORLESS DIRECT CURRENT MOTOR, DRIVER CIRCUIT FOR A DRIVE AND METHOD OF OPERATING A COLLECTORLESS DIRECT CURRENT MOTOR".*

BACKGROUND OF THE INVENTION

The present invention relates to a collectorless direct current motor equipped with a fan or for driving a fan and including a permanent magnet rotor in the field of at least one stator winding and to a method of operating such a motor. In particular, the invention relates to a driver circuit for a collectorless direct current motor including a permanent magnet rotor having at least two poles and at least one stator winding connected to the driver circuit end stage which temorarily operates as a switch and a sensor detecting the position of the rotor, with the control signal fed to the end stage during each commutation phase causing the current in the stator winding to have a ramp-shaped configuration.

Such a driver circuit is disclosed in No. DE-OS 3,107,623 and includes an RC member with the aid of which rectangular signals are reshaped to control the direct current motor in order to reduce the steepness of their edges, thus reducing the winding noise of the motor. However, in the known driver circuit, there exits neither a possibility to change the number of revolutions nor a possibility to regulate the number of revolutions as a function of an external physical value independently of the operating voltage.

It is known to detect the position of the rotor by means of at least one galvanomagnetic element, a Hall generator or the like, and to use the signal generated in this element, which is a function of the rotor position, to control, by way of semiconductor elements, the currents in one or a plurality of stator windings.

The control circuits employed for this purpose are supplemented by members which regulate the number of revolutions as a function of externally detectable physical values with an otherwise constant operating voltage. Regulation of the number of revolutions may be controlled as a function of various parameters or it may involve an adjustment of the number of revolutions of a fan driving motor which provides ventilation that is automatically adapted to demands for a stream of air. In this case, the fan may be part of a device to be cooled which heats up to different temperatures and whose heat is to be dissipated by the fan. In that case, the heat to be dissipated would be the external physical command variable which determines the regulation of the number of revolutions.

Not only for this exemplary case of use but quite generally, users or manufacturers of such direct current drives desire to make available the smallest possible motors for their space-saving advantages. Power losses should be kept low.

To vary the output of motors operated with a constant operating voltage, it is known to pulse width modulate the motor current. In this case, a low pulse frequency in the audible frequency range is selected. Such a frequency does not produce much additional power loss and does not radiate much interference onto adjacent devices, but it does have the drawback of developing a considerable amount of additional noise. Therefore it is also known to select a high pulse frequency in order to reduce noise. Then, stray high frequency fields result which interfere with the devices with which the fans and the corresponding direct current drives are associated. The simplest regulation employs a rough turn-on and turn-off range with the drawback of restless, rumbling motor operation. The demand for small structures gives rise to the additional desire to integrate the components employed in the circuits and to combine them in a chip. Therefore, the power losses in the integrated active and passive components employed must be kept low so that the components can be placed in close, juxtaposition and encapsulated. This demand is counter to the necessity of allowing sufficient current to flow in the electromagnetic peaks then occur in the control circuits and the heat generated by these peaks must not be permitted to destroy the integrated electronic components.

SUMMARY OF THE INVENTION

It is an object of the invention to make available a driver circuit for a collectorless direct current motor so as to permit changes in output power and number of revolutions with small amounts of circuitry and at a constant operating voltage; power losses in the components should be low, particularly in the semiconductor paths and here again particularly in the amplifying semiconductor paths, e.g. the end stage transistors. Moreover, additional motor noise and stray high frequency interferences should be kept low.

To solve these problems it is proposed, in general, to permit the active components, i.e. inserted semiconductor paths, to act differently in the same circuit in dependence on given external conditions or external physical command variables. For example, some of the semiconductor elements for controlling the currents for the stator winding or windings may operate as analog amplifier elements and, near the maximum possible number of revolutions, as switches, to thus shorten the turn-on duration, for example, during a commutation phase. As one feature of this solution, ramp-shaped current curves can be generated in the circuit over time, along which the switch positions may be varied. Another possible solution can be realized by means of a delay circuit which delays the moment of turn-on given by the position detector as a function of the external command variable.

As a whole, the invention is based on the idea of avoiding power losses in all components. Thus it becomes possible to integrate the components. The external conditions for the different operating states are detected by at least one component. It is known to employ temperature sensitive components in a ventilation stream to regulate the number of revolutions or power of a collectorless direct current motor used in conjunction with 9 a fan. This, however, is effected by directly setting the power output in the end stage semiconductors. Although this does not produce any additional high frequency fields which could interfere with the devices to be ventilated and such a regulation does not produce any additional noise, a considerable amount of additional power loss develops in the partial load range concomitant with heating of the semiconductor paths. This heating is an impediment for integration of the components. The present invention is based on the realization that, over long "on" periods, these motors are driven only in the partial load range. According to the invention, the motor current is therefore regulated within this range, for example by way of pulse width modulation with a frequency equal to the commutation frequency of the motor and by operating the actuated end stage semiconductor within one turn-on phase as a switch and subsequently in an analog mode. During this analog operation, the motor current can be reduced, for example, according to a ramp function generated in the driver circuit.

The combination of switch operation and analog operation, preferably in connection with a low rate of revolution at synchronous switching frequencies, permits a significant reduction of the losses in the semiconductor paths and also of electromagnetic and acoustic interferences.

As a further feature of the present invention, the instant at which the motor current is turned on, when the motor is under partial load, is delayed with respect to the turn-on instant which is indicated by a position indicator. This produces a further smoothing of motor operation. Evidently two effects are here at work. The generation of a parasitic axial force which has its maximum in the commutation range is reduced. Secondly, the counter-emf which rises rapidly after the theoretical moment of commutation now considerably reduces the current rise rate so that in spite of pure switch operation, the current increases relatively slowly.

BRIEF DESCRIPTION OF THE DRAWINGS

Further features, aspects, configurations and advantages of the invention will become evident from the claims and the description below of embodiments which are illustrated in the drawing figures.

DETAILED DESCRIPTION OF THE PREFERRED EMBODIMENT

Figure 1:
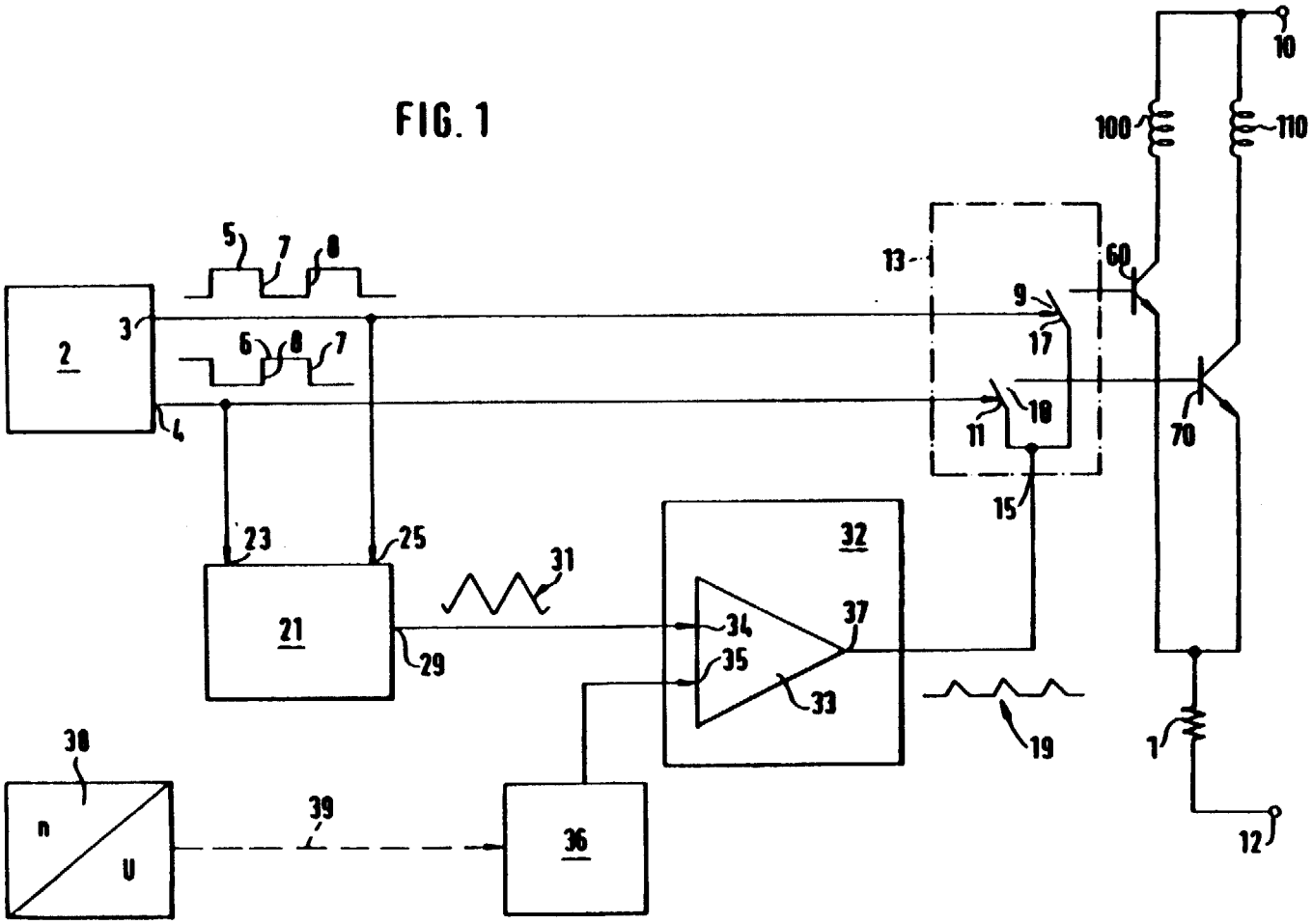
FIG. 1 shows a block circuit diagram to illustrate the basic function of a driver circuit according to the invention.

The block circuit diagram shown in FIG. 1 shows a driver circuit for a collectorless direct current motor including a first stator winding 100 and a second stator winding 110. Stator windings 100, 110 are connected, with their one winding end, to a first terminal 10 to supply the operating voltage for the collectorless direct current motor. First stator winding 100 lies in the collector circuit of a power transistor 60 of the driver circuit while second stator winding 110 lies in the collector circuit of a power transistor 70. The emitters of power transistors 60, 70, which form the end stage of the driver circuit, are connected, via a feedback resistor 1, with a second terminal 12 for the operating voltage. By alternatingly periodically actuating power transistors 60 and 70, magnetic fields are generated alternatingly by stator windings 100, 110 to cause the permanent magnet rotor of the collectorless direct current motor to rotate.

The continuous rotary position of the rotor (not shown in the drawing) of the direct current motor is detected with the aid of a sensor circuit 2 which may contain, for example, a Hall element associated with an amplifier and a pulse shaping member. Corresponding to the rotation of the rotor, pulse-shaped periodic sensor signals 5, 6 offset by 180° appear at outputs 3, 4. The negative edges 7 of pulse-shaped sensor signals 5 lie, in time, shortly before the positive edges 8 of pulse-shaped sensor signals 6. Correspondingly, the negative edges 7 of sensor signal 6 lie, in time, shortly before the positive edges 8 of sensor signal 5.

As can be seen in FIG. 1, the periodic sensor signals 5, 6 do not directly actuate power transistors 60, 70 as is the case in conventional driver circuits for collectorless direct current motors.

As can be seen in FIG. 1, outputs 3, 4 of sensor circuit 2 are connected with control inputs 9, 11 of a linkage circuit 13. Linkage circuit 13 makes it possible to apply an end stage control signal 19 present at input 15 of linkage circuit 13 selectively to the base of power transistor 60 or to the base of power transistor 70 in dependence on the signals at control inputs 9, 11. Linkage circuit 13 fixes a time frame for actuation of power transistors 60, 70 corresponding to the commutation periods of the direct current motor, with such time frame being defined by the closed position of switches 17, 18 which symbolically represent linkage circuit 13. If, for example, control input 9 is charged by a positive edge of sensor signal 5, switch 17 closes so that the end stage control signal 19 present at input 15 of linkage circuit 13 is able to reach the base of power transistor 60. If the negative edge appears, switch 17 opens and end stage control signal 19 is prevented from acting on power transistor 60. However, as soon as switch 18 of linkage circuit 13 is closed via control input 11, end stage control signal 19 reaches power transistor 70.

The driver circuit according to FIG. 1 is configured in such a way that the pulses of the likewise pulse-shaped end stage control signal 19 are less in duration than the pulses of sensor signals 5, 6. In this way it is possible to effect the actuation of power transistors 60, 70 each time only within part of the time frame given by the pulses of sensor signals 5, 6. If the respective pulses present at input 15 become shorter compared to the pulses present at control inputs 9, 11, the times during which current flows through power transistors 60, 70 and stator windings 100, 110 become shorter. The pulse lengths in end stage control signal 19 thus permit influencing the torque and/or the number of revolutions of the collectorless direct current motor. Moreover, the signal shape of the pulses of end stage control signal 19 can be designed in such a manner that the leading and/or trailing edges of the currents flowing through stator windings 100, 110 become flatter, keeping motor noise and power losses in power transistors 60, 70 as low as possible.

According to the block circuit diagram shown in FIG. 1, end stage control signal 19 is generated by a ramp generator 21 which is connected, via two control inputs 23, 25, with outputs 3, 4 of sensor circuit 2. Ramp generator 21 is, for example, a sawtooth or delta voltage generator which makes available at its output 29 a delta voltage 31 whose frequency is double the frequency of sensor signals 5, 6.

Between output 29 of ramp generator 21 and input 15 of linkage circuit 13 lies a pulse width shaper 32. Pulse width shaper 32 includes a comparison amplifier circuit, abbreviatedly called comparator 33 which receives the delta voltage signal 31 at its first input 34 and the output signal of a number of revolutions setting circuit 36 at its second input 35. The output signal of number of revolutions setting circuit 36 serves to preset a threshold value in such a manner that a signal appears at output 37 whenever delta voltage 31 lies above the respectively set threshold value. In this way, output 37 furnishes an end stage control signal 19 of delta voltage pulses whose maximum amplitude and whose base lengths are dependent on the signal at the second input 35 of comparator 33. If, for example, number of revolutions setting circuit 36 sets a lower threshold value, the edges of end stage control signal 19 approach one another in that the pulse shape of end stage control signal 19 approximates the pulse shape of delta voltage 31, with the base length of the pulses and their maximum amplitude at the delta voltage peaks becoming greater.

If end stage control signal 19 reaches power transistors 60, 70 with delta pulses which are spaced at a greater distance from one another, the current through stator windings 100, 110 increases corresponding to the increasing delta edges. In this case, power transistors 60, 70 switch through completely only if end stage control signals 19 exceed an amplitude given by the respective circuit and the impedance of stator windings 100, 110. Until this switching state is reached, power transistors 60, 70 operate in the analog mode. After power transistors 60, 70 have switched, the current curve through stator windings 100, 110 changes only slightly until, finally, the descending edges actuate a slower current drop in end stage control signal 19.

The change in amplitude of the output signal of a revolution rate setting circuit [3] *36* thus makes it possible to vary the pulses lengths by means of stator windings 100, 110 within the time frame for setting the number of revolutions as given by sensor signals 5, 6.

If it is desired to regulate the revolution rate in a closed control circuit, a revolution rate sensor 38 may be provided as likewise shown in FIG. 1, which converts the number of revolutions n per unit time of the direct current motor into a direct voltage U which travels through a line 39 to the revolution rate setting circuit 36. It is then possible to set a revolution rate which is monitored with the aid of the sensor 38 and causes the revolution rate to be adjusted by a change in the output signal of the setting circuit 36, for example, if the revolution rate drops due to a greater motor load.

Figure 2:
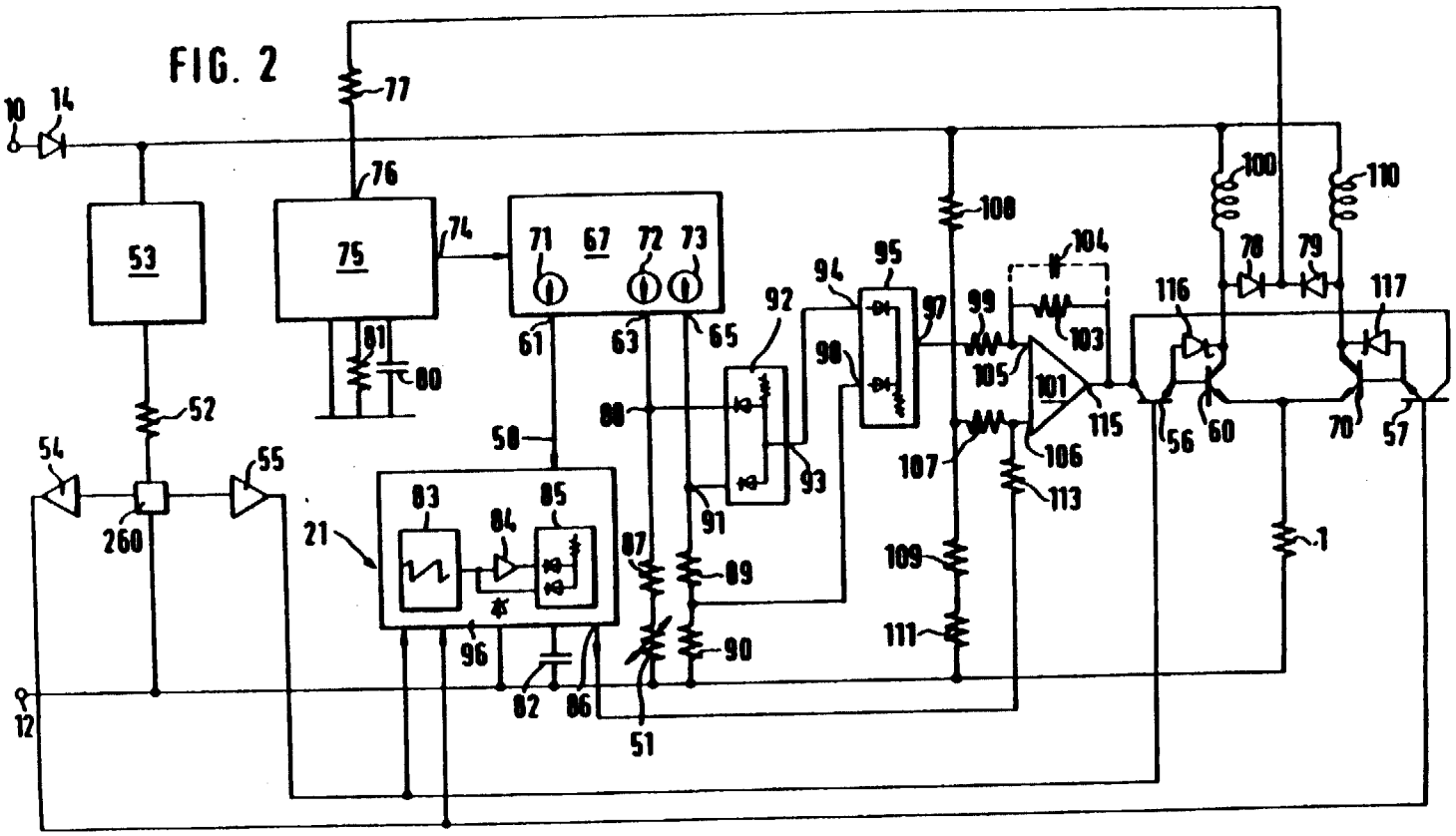
FIG. 2 shows a block circuit diagram for a first embodiment of the driver circuit according to the invention.

FIG. 2 shows exemplary embodiments to clarify some details of the block circuit diagram shown in FIG. 1 for a driver circuit according to the invention. Components already known from FIG. 1 bear the same reference numerals. The driver circuit according to the embodiment shown in FIG. 2 likewise serves to actuate dual pulse, two-wire, collectorless direct current motors. A change in torque and/or revolution rate of the direct current motor is effected by changing the ratio of duration of turn-on to turn-off within each commutation period associated with the above-mentioned time frame. Switching of the motor current therefore takes place "gently" in order to suppress as much as possible any switching noises and high frequency interferences. For that reason, power transistors 60, 70 operate temporarily as linear amplifiers during turn-on and turn-off, respectively, and gradually change the current flowing through stator windings 100, 110 according to a given ramp function having a constant edge slope. In a manner to be described below, the number of revolutions of the direct current motor is regulated with the use of the voltage induced in stator windings 100, 110 by means of a simple power controller. The command variable for the revolution rate is the applied operating voltage to which the revolution rate is approximately proportional and, if desired, the ambient temperature which is detected with the aid of a measuring sensor including a temperature-dependent resistor 51, for example an NTC resistor.

According to the embodiment shown in FIG. 2, the sensor circuit known from FIG. 1 includes a Hall generator 260, whose first control input is connected to terminal 12 and whose second control input is connected, via a resistor 52 and a device 53 providing thermal overload protection, to the operating voltage supplied through terminal 10 and a diode 14. The device 53 providing thermal overload protection includes a monitoring circuit for the temperature of power transistors 60, 70, so as to ensure turn-off with hystresis if the permissible transition zone temperature of power transistors 60, 70 is exceeded.

Hall generator 260 furnishes voltages proportional to the magnetic field of the direct current motor and these voltages are amplified via comparators 54 and 55 in order to generate the sensor signals 5, 6 shown schematically in FIG. 1. The pulse-shaped sensor signals 5, 6 are fed, on the one hand, to a linkage circuit formed of transistors 56, 57 and, on the other hand, to ramp generator 21. The effect of transistors 56 and 57 corresponds to switches 17 and 18 shown in FIG. 1.

Ramp generator 21 is configured as a delta voltage generator including a control input 58 connected with the first output 61 of a current generator 67 which has a second output 63 and a third output 65 and is connected with three controlled current sources 71, 72 and 73. Current sources 71, 72, 73 are controlled via a smoothed direct voltage which appears at output 74 of a lowpass filter 75 whose input 76 is connected, via a resistor 77 and diodes 78, 79, with the transistor side ends of stator windings 100, 110. By way of diodes 78, 79, a voltage induced in stator windings 100, 110 which constitutes a measure of the number of revolutions, reaches lowpass filter 75 which, in addition to a filter capacitor 80, includes an external fixed resistor 81 so as to make the voltage/current conversion independent of the absolute tolerances of the internal resistances. Since the driver circuit shown in FIG. 2 is realized as an integrated circuit, several stages are provided with terminals for external connections, such as, for example, the mentioned filter capacitor 80 or fixed resistor 81.

Since the output signal at output 74 of lowpass filter 75 is a signal proportional to the revolution rate, current sources 71, 72, 73 are controlled according to the revolution rate of the direct current motor.

The first current source 71 serves to charge a capacitor 82 which is associated with ramp generator 21 so that a ramp-shaped voltage is generated across capacitor 82. By regularly discharging capacitor 82, a sawtooth voltage is formed in a sawtooth generator 83. The amplitude of the sawtooth signal of sawtooth generator 83 is thus substantially independent of the number of revolutions and the operating voltage. With the aid of an inverter 84, the sawtooth voltage is converted into an oppositely directed sawtooth voltage. Both sawtooth voltages, the original sawtooth voltage and the inverted sawtooth voltage, feed an analog comparison circuit 85 which supplies the respective lower one of the two voltages at output 86, thus producing a delta-shaped signal voltage at output 86.

In order for the highest point of the delta voltage signal to lie approximately in the middle between two successive commutation moments of the direct current motor and to make this position independent of the operating voltage, the inverting stage including inverter 84 is connected to a fixed reference potential as indicated by a Zener diode 96.

The second current source 72, controlled in proportion with the revolution rate, feeds a series connection of a series resistor 87 and the temperature dependent resistor 51 which serves as a temperature measuring sensor and may be a thermistor, its characteristics can be tuned by way of series resistor 87.

The voltage drop occurring across this series connection constitutes a measure of the momentary number of revolutions and the momentary temperature and can be picked up at circuit point 88.

Controlled current source 73 controls a series connection composed of fixed resistors 89 and 90. The voltage drop occurring across the associated circuit point 91 is likewise associated with the momentary number of revolutions of the direct current motor, but contrary to the voltage drop present at circuit point 88, it is not additionally dependent upon the temperature.

Circuit points 88, 91 are connected with the two inputs of a comparison stage 92 which at its output 93 supplies a signal associated with the respective lower value at its two inputs. Due to the selection of the respectively lower value, the revolution rate of the direct current motor is not reduced further if the temperature falls below a given limit temperature, rather the number of revolutions is held at a fixed minimum value determined by fixed resistors 89 and 90.

The output signal of comparison stage 92 feeds the first input 94 of a further comparison stage 95.

Further comparison stage 95 serves, on the one hand, to permit operation as a function of the revolution rate at temperatures above the lower limit temperature. Similarly to comparison stage 92, further comparison stage 95 emits, at its output 97, a signal which corresponds to the respective greater one of the two input signals. As its second input signal, second input 98 receives the voltage drop across fixed resistor 90. Further comparison stage 95 also serves to prevent further increases in the regulating difference signal when a certain upper limit temperature is exceeded so that, even at the highest possible revolution rate, the pulses of end stage control signal 19 have a shorter length in time than the pulses of sensor signals 5, 6 and thus it is still possible to control the ramps at power transistors 60, 70 and no pure switching operation occurs in power transistors 60, 70, which would be undesirable since it would produce running noises and electrical interferences.

Output 97 of further comparison stage 95 is connected, via a resistor 99, with a comparison amplifier 101 which is connected as linear amplifier having a feedback resistor 103 which is bridged by a capacitor 104 acting as attenuating element and is in communication with the first input 105.

The second input 106 of comparison amplifier 101 is connected, via a resistor 107, with a series connection of resistors 108, 109, 111 which is connected with the operating voltage source. Comparison amplifier 101 thus compares the voltage across the first input 105—which is limited in its limit values and is associated with the temperature and/or the revolution rate—with a voltage supplied via resistor 107 on which, however, is superposed, via a resistor 113, the delta voltage appearing at output 86.

Consequently, the output signal of comparison amplifier 101 is a delta-shaped voltage signal whose amplitude is a function of the comparison of the voltages across inputs 105, 106. With decreasing revolution rate and increasing temperature, respectively, the average amplitude of the output signal of comparison amplifier 101 increases, with a delta voltage signal always being superposed on a variable direct voltage signal.

Comparison amplifier 101 acts as a revolution rate regulator whose gain is defined by resistor 99 and feedback resistor 103. The voltage drop picked up by way of resistor 107 here serves as the desired revolution rate value on which a delta voltage is superposed to form a ramp-like increasing and decreasing current curve in stator windings 100, 110. The slope of the current rise and drop, respectively, is defined essentially by the ratio of resistor 107 to 113.

The signal appearing at output 115 of comparison amplifier 101 is alternatingly fed, via transistors 56, 57 which act as analog switches, to power transistors 60, 70 corresponding to the time frame defined by the commutation phases. Transistors 56, 57 then decide which one of the two power transistors 60, 70 receives the end stage control signal 19 furnished by comparison amplifier 101. As mentioned above, this decision is made with the aid of the output signals of comparators 54 and 55.

To ensure analog further processing of the delta-shaped end stage control signals 19 of comparison amplifier 101, the already mentioned feedback resistor 1 is provided as feedback element.

Power transistors 60, 70 have associated Zener diodes which serve to limit the maximum turn-off voltage across power transistors 60, 70 so that even if the ramp control of power transistors 60, 70 does not operate, no excess turn-off voltages are generated.

Further embodiments of the invention will be described below on the basis of the basic principles applicable to the block circuit diagram shown in FIG. 1.

Figure 3:
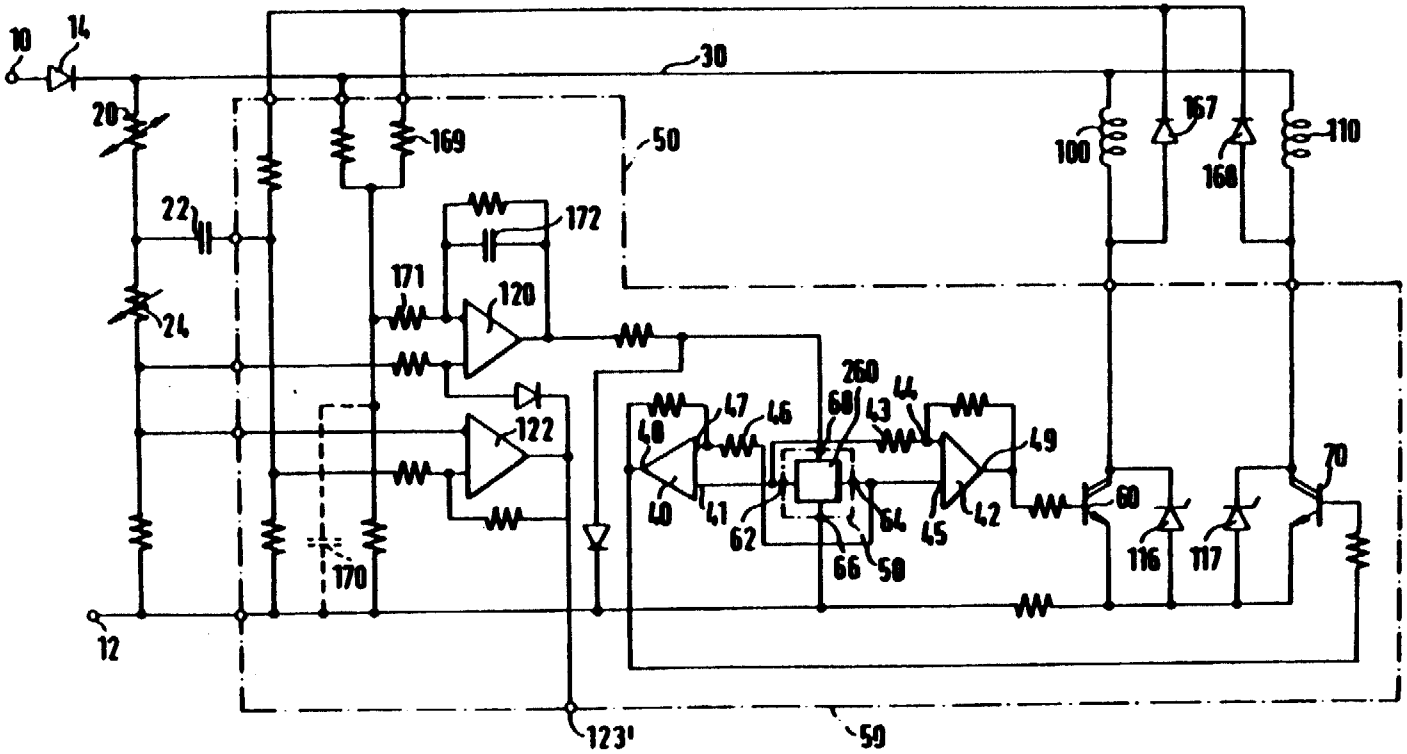
FIG. 3 shows a circuit for a dual-pulse, two-wire, collectorless direct current motor with or without reluctance moment in which the number of revolutions is regulated as a function of an external physical value without an internal auxiliary value.

The constant operating voltage $V_{CC}$, for example a direct current of 12 Volts, is present at terminals 10 and 12 of the circuit shown in FIG. 3. This voltage is regulated in dependence on a variable element 20, for example a thermistor disposed in a circuit 50 in the ventilating air stream.

A line 30 conducts the operating voltage via a diode 14 directly to stator windings 100 and 110. Outside of circuit 50, in a suitable position with respect to the permanent magnet rotor (not shown), a Hall generator 260 is provided as position detector.

Circuit 50 is designed so that it can be laid out as an integrated circuit. Two operational amplifiers 40 and 42, in conjunction with Hall generator 260, serve as comparators. One output 62 of Hall generator 260 is connected directly with the non-unverting input 41 of comparator 40 and, via a resistor 43, with the inverting input 44 of comparator 42. The antivalent output 64 of Hall generator 260 is connected in the same manner directly with the non-inverting input 45 of comparator 42 and, via a resistor 46, with the inverting input 47 of comparator 40. Output 48 of comparator 40 is connected with power transistor 70 and output 49 of comparator 42 is connected with power transistor 60, with the power transistors themselves supplying the amplifier current to stator coils 100 and 110, respectively. While terminal 66 of Hall generator 260 is connected directly with pole 12, terminal 68 is regulated via an operational amplifier 120 in dependence on thermistor 20. A comparison is made between a desired value and the actual value with the aid of operational amplifier 120 as well as with the aid of operational amplifier 122. Depending on the voltage generated by thermistor 20 as a function of the temperature of the stream of air in conjunction with capacitor 22, transistors 60 and 70 are supplied in such a manner that, in the normal partial load range, they act as analog amplifier elements. Capacitor 22 prevents immediate turn-off by operational amplifier 122 during start-up.

In the upper revolution rate range or near the maximum possible revolution rate, the revolution rate is regulated primarily by a variation of the turn-on duration of the motor current. In the lower revolution rate range, the revolution rate is regulated at least additionally by a variation of the amplitude of the motor current. Additionally, a temperature independent safety switching voltage is available at an output 123' which turns off the motor after a settable period of time if there is an overload. Or an alarm signal can be given if a limit value is exceeded or not reached.

As can be seen in FIG. 3, the winding ends of stator windings 100, 110 on the side of the transistor are connected with diodes 167, 168 which couple out the voltages induced in stator windings 100, 110 so that voltage proportional to the revolution rate results which is fed to operational amplifiers 120, 122 for linkage purposes. Operational amplifier 122 serves to send an alarm to output 123' if a limit revolution rate is not reached. The induced voltage is filtered via RC members 169, 170 and integrators 171, 172, respectively, so that the ripple, i.e. the alternating voltage component, of this voltage is shifted preferably by 180 degrees with respect to its fundamental wave. The thus filtered signal is superposed on the control path of Hall generator 260 so that the output signals of Hall generator 260 also have a ripple which is fed to amplifier stages 40, 42 and thus to power transistors 60, 70. This causes the end stage to form current curves, if the motor output is reduced, which are approximately analogous to the ripple of the induced voltage and contain a slight amount of overshooting.

Figure 4:
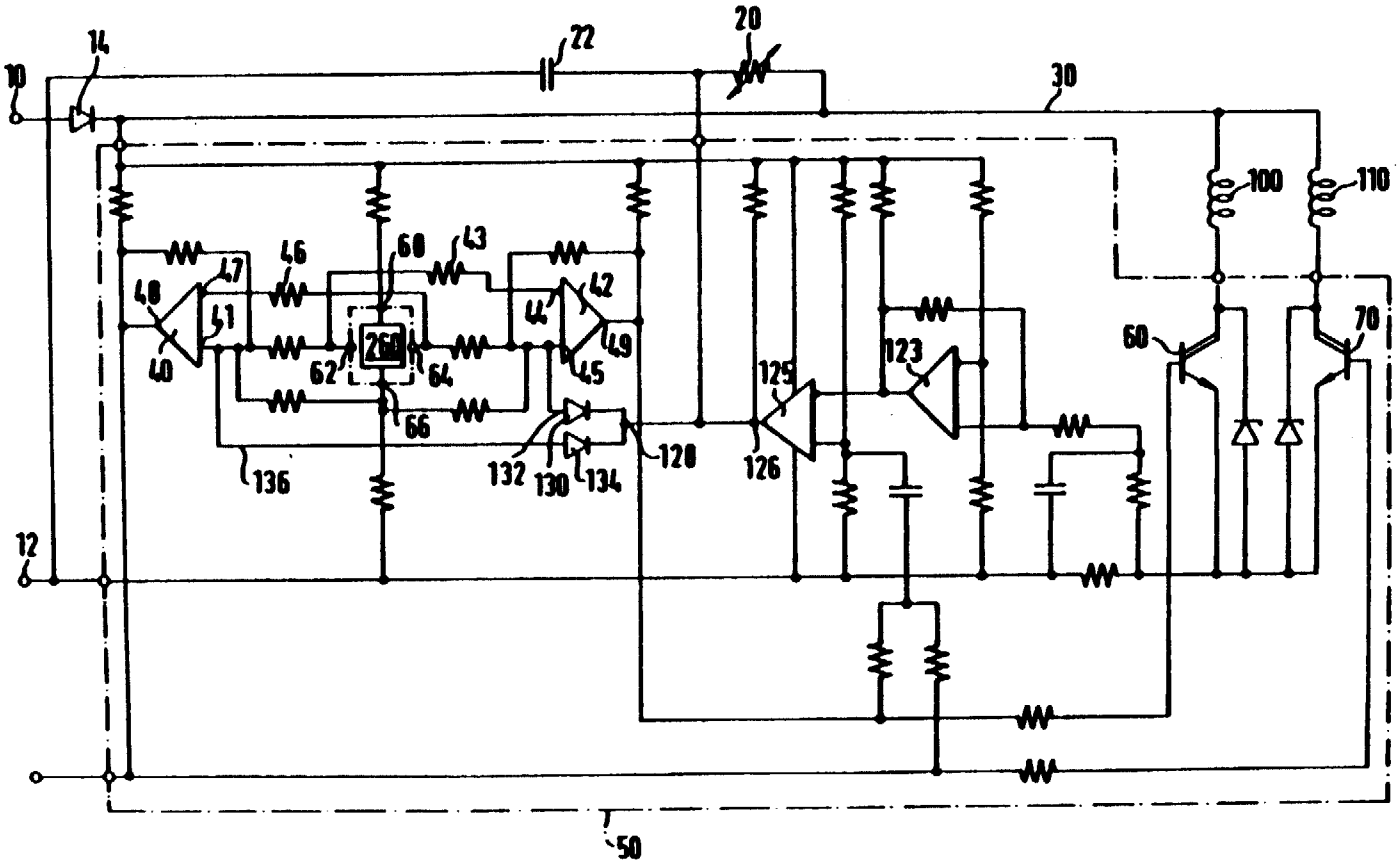
FIG. 4 shows an embodiment modified, compared to FIG. 3, with respect to the initiation of a control voltage.

While, according to FIG. 3, the type of switching and the switching position of transistors 60 and 70 is controlled by way of Hall generator 260, FIG. 4 shows a circuit which is provided for switching and actuating transistors 60 and 70 by means of operational amplifiers 123 and 125 which generate a variable signal at output 126 which is coupled directly to the non-inverting inputs 41 and 45 of comparators 40 and 42, respectively. If the temperatures at thermistor 20 are high, the voltages across these inputs 41 and 45 are [reduced] *changed* to such an extent that, during the commutation phase, the "turn-on [pauses] *pulses*" in the current downstream of transistors 60 and 70 become longer.

The number of revolutions is changed in dependence on the temperature. Capacitor 22 is discharged during each commutation process and is recharged differently by way of thermistor 20 in dependence on the measured temperature. This voltage is present across inputs 41 and 45, respectively, via line 128 and simultaneously via diodes 130, 134 and lines 132, 136, in parallel with the voltages generated by Hall generator 260. As long as the voltage furnished by capacitor 22 is less than the voltages put out by Hall generator 260, the motor current remains turned off. Thus a greater or smaller turn-on delay is created in dependence on the temperature for the currents flowing through coils 100 and 110, respectively. This sole turn-on delay may lead to undesirable, loud motor noises.

Figure 5:
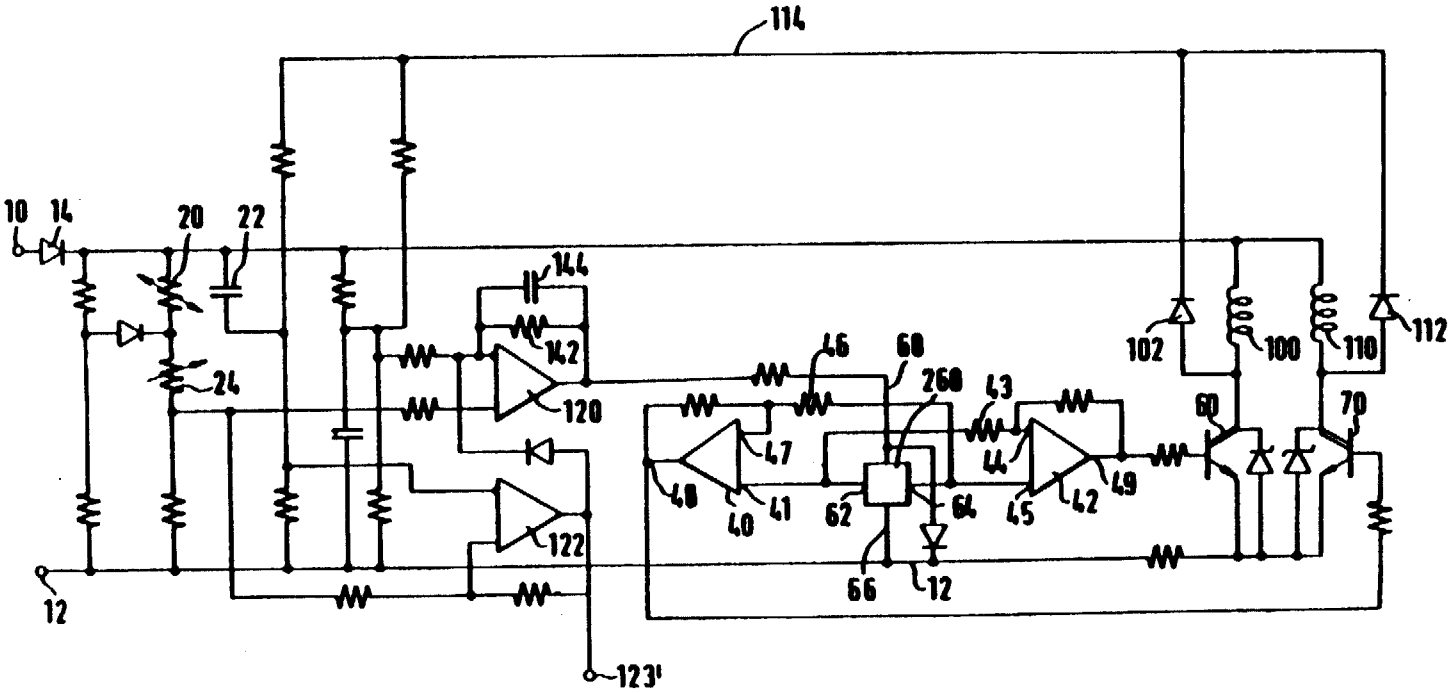
FIG. 5 shows a circuit example including an additional control voltage generated across the stator coils.

Therefore, FIG. 5 shows a circuit, as a modification of FIG. 3, in which not the pauses but the shape of the current curve between the pauses is influenced. This is a temperature dependent regulation of the revolution rate in a narrower sense. A measure for the existing revolution rate the generator voltage of coils 100 and 110 through which no current flows and which is applied via diodes 102 and 112, respectively, and a line 114 to the inverting inputs of operational amplifiers 120 and 122, respectively. The ripple in this voltage superposed thereby serves in an analogous manner to form rounded current curves for the currents to coils 100 and 110 between the "pauses" which are kept short since, according to this circuit, they are not being influenced. The result is a smooth and quietly running motor compared to the embodiment of FIG. 4. In this circuit embodiment as well, the desired value for the revolution rate is obtained via thermistor 20 in dependence on the temperature. By means of an adjustable voltage divider 24, a minimum revolution rate may additionally be provided. Moreover, the circuit can be arranged in such a manner that the motor can be turned off completely at a revolution rate which is 50% below a desired revolution rate.

Moreover, an alarm signal can be put out and/or processed further at output 123' if the revolution rate is too low.

Figure 6:
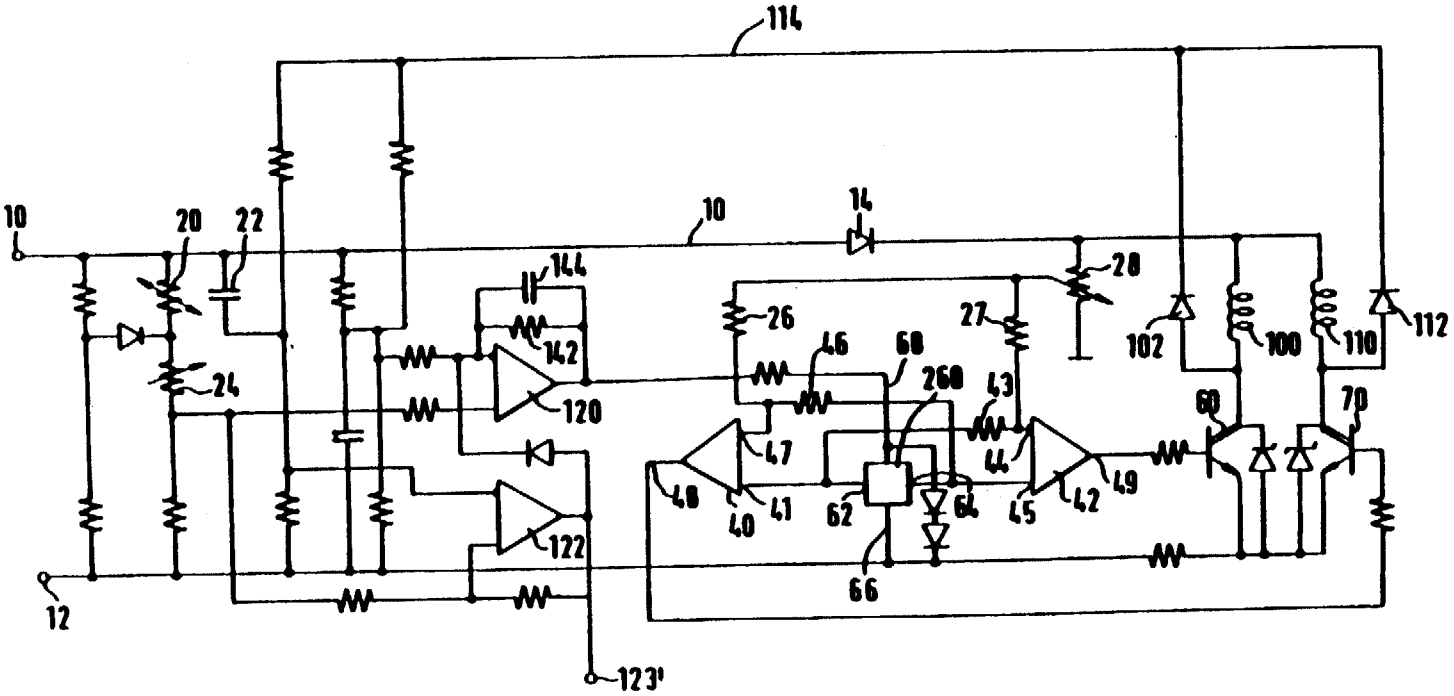
FIG. 6 shows a modified embodiment compared to FIG. 5.

FIG. 6 shows a circuit which is modified compared to FIG. 5. The shape of the turn-on current, i.e. its rounded portions, are produced as described above. The simultaneous regulation of the turn-on pauses, also described above, can additionally be given adjustable limits by way of members 28 and 26 as well as 27.

Figure 7:
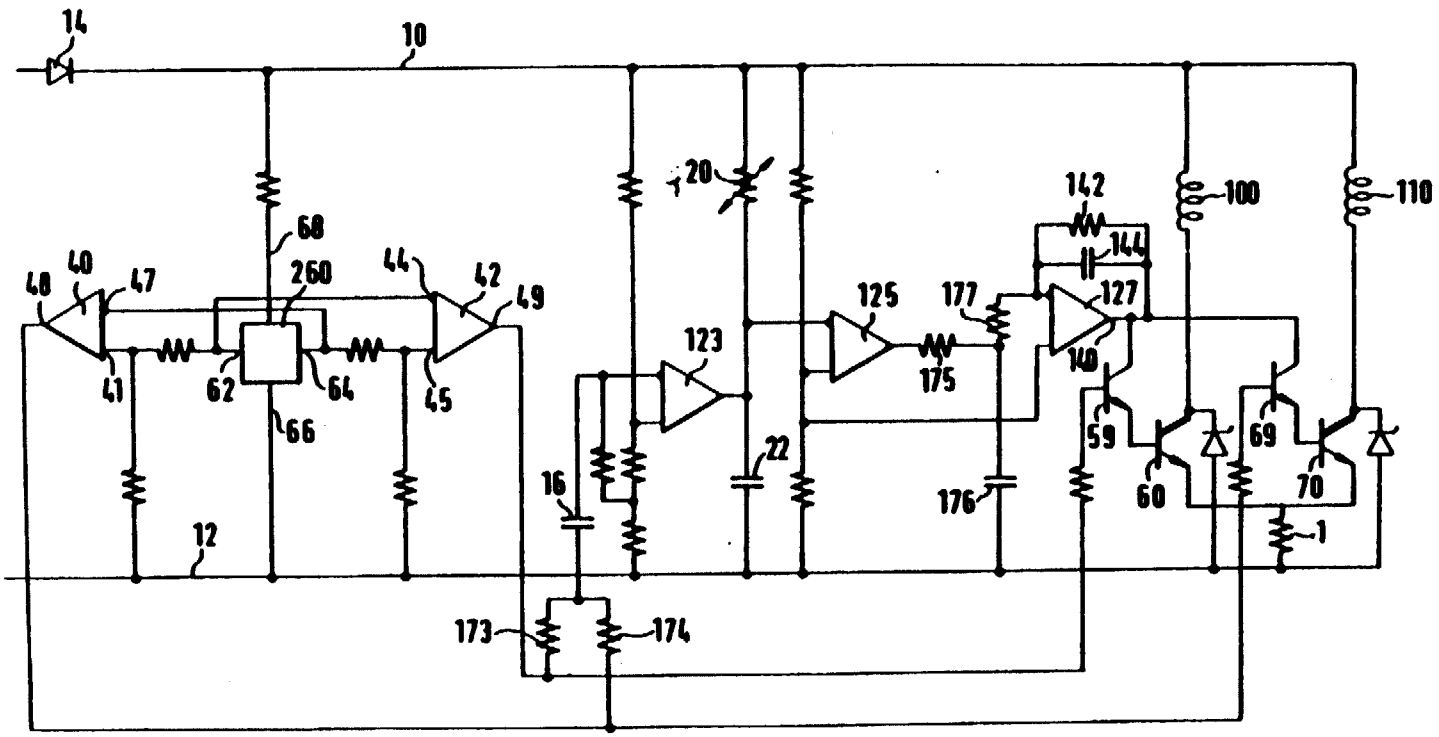
FIG. 7 shows a first simple embodiment including a generator inserted to generate a ramp edge.

FIG. 7 shows a circuit in which the power stage is influenced directly parallel to and downstream of the Hall generator stage. Output 48 is connected, via a transistor 69, to end stage transistor 70 and output 49 is connected, via a transistor 59, to end stage transistor 60. The signal to change the turn-on pause for the current sent at the corresponding temperature by thermistor 20 to coils 100 and 110, respectively, is obtained via operational amplifier 127 at its output 140 and is fed to transistors 59 and 69, respectively, via respective semiconductor paths which produce a switching effect. The inverting input of operational amplifier 127 is bridged toward output 140 by means of a low capacitance capacitor 144 and a resistor 142.

In addition, a capacitance 16 is provided which permits, via an operational amplifier 123, an edge configuration of the current between turn-on pauses as will be described in greater detail below.

As can be seen from the circuit diagram of FIG. 7, in the driver circuit shown there, it is not the induced voltage which is used as a measure for the revolution rate, but the time interval between two commutations. The rectangular pulses obtained from the Hall signal and appearing at outputs 48, 49 of comparator stages 40, 42 are used for this purpose. They are added by way of two resistors 173, 174, with the sum signal being supplied via capacitor 16 to comparator 123. This comparator becomes temporarily conductive during each change in commutation, i.e. during each change in switching states of transistors 60 and 70, and discharges capacitor 22 which is then able to charge itself via temperature dependent resistor 20. Depending on the temperature, this charging takes place faster or slower. Moreover, the charge state of capacitor 22 is dependent on the time duration of the charging process and thus on the revolution rate. Thus, both informations required to permit temperature dependent regulation of the revolution rate are available at resistor 20 and at capacitor 22. The associated signal is compared with a voltage obtained from a fixed voltage divider and the difference signal is fed to an operational amplifier 125. The output signal of the operational amplifier is filtered via a first filter member 175, 176 and an integrator including a series resistor 177, a feedback capacitor 144 and an operational amplifier 127. Finally, the filtered signal is fed to analog switches 59 and 69. Analog switches 59, 69 additionally receive the output signal of comparator circuits 40, 42. Thus, the end stage is turned on, on the one hand, in accordance with the output voltages of comparators 40 and 42 and, on the other hand, the turn-on duration and the maximum base current of power transistors 60, 70 is influenced by the output signal of operational amplifier 127.

In this way it is accomplished that the motor current cannot be turned on over the full turn-on duration given by Hall element 260, but is variable in dependence on the ambient temperature detected by element 20. Filtering in filter stages 175, 176 and 177, respectively, and in filter stage 144 results in the originally delta-shaped or sawtooth shaped signal at the output of operational amplifier 125 being changed to a greatly rounded signal which constitutes a favorable prerequisite for low-noise motor operation.

Figure 8:
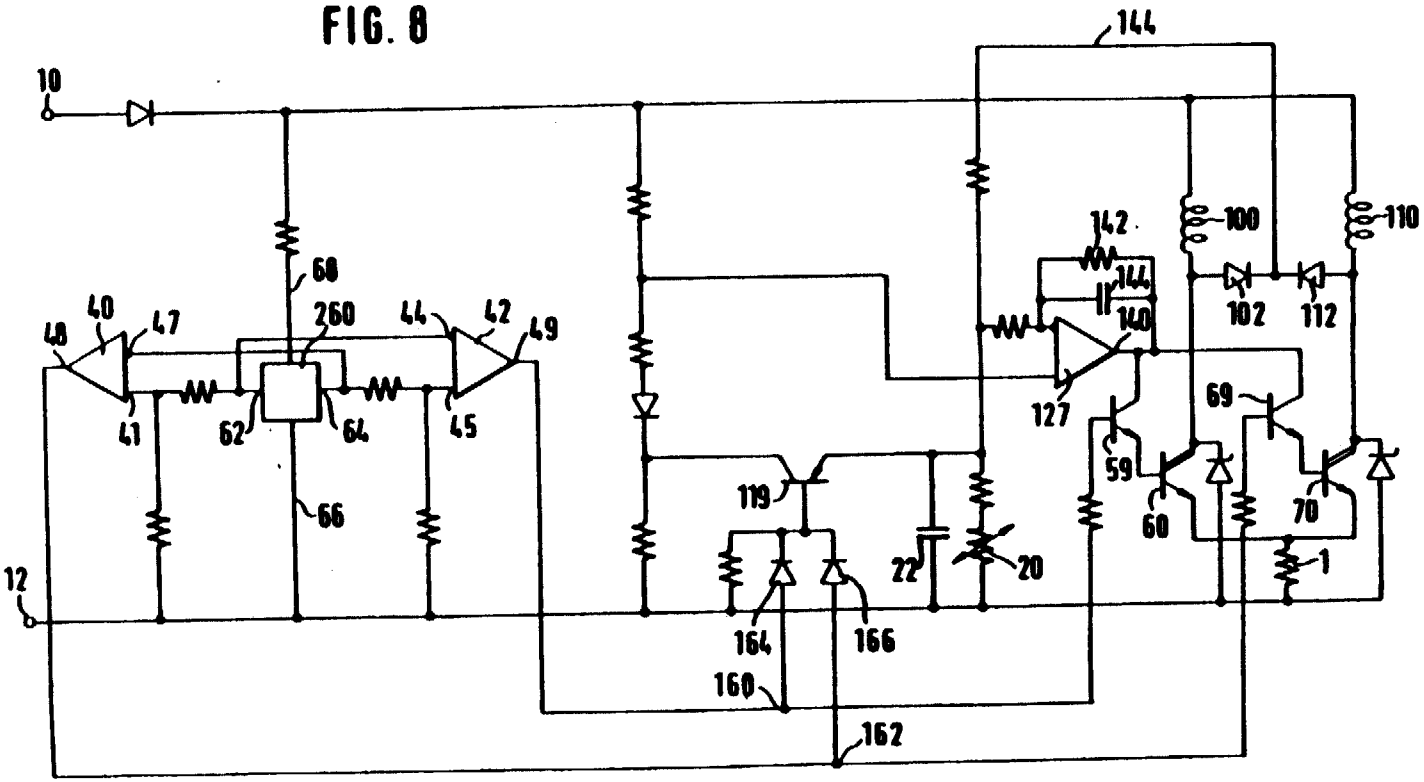
FIG. 8 shows a modified embodiment for generating the ramp edge.
Figure 9:
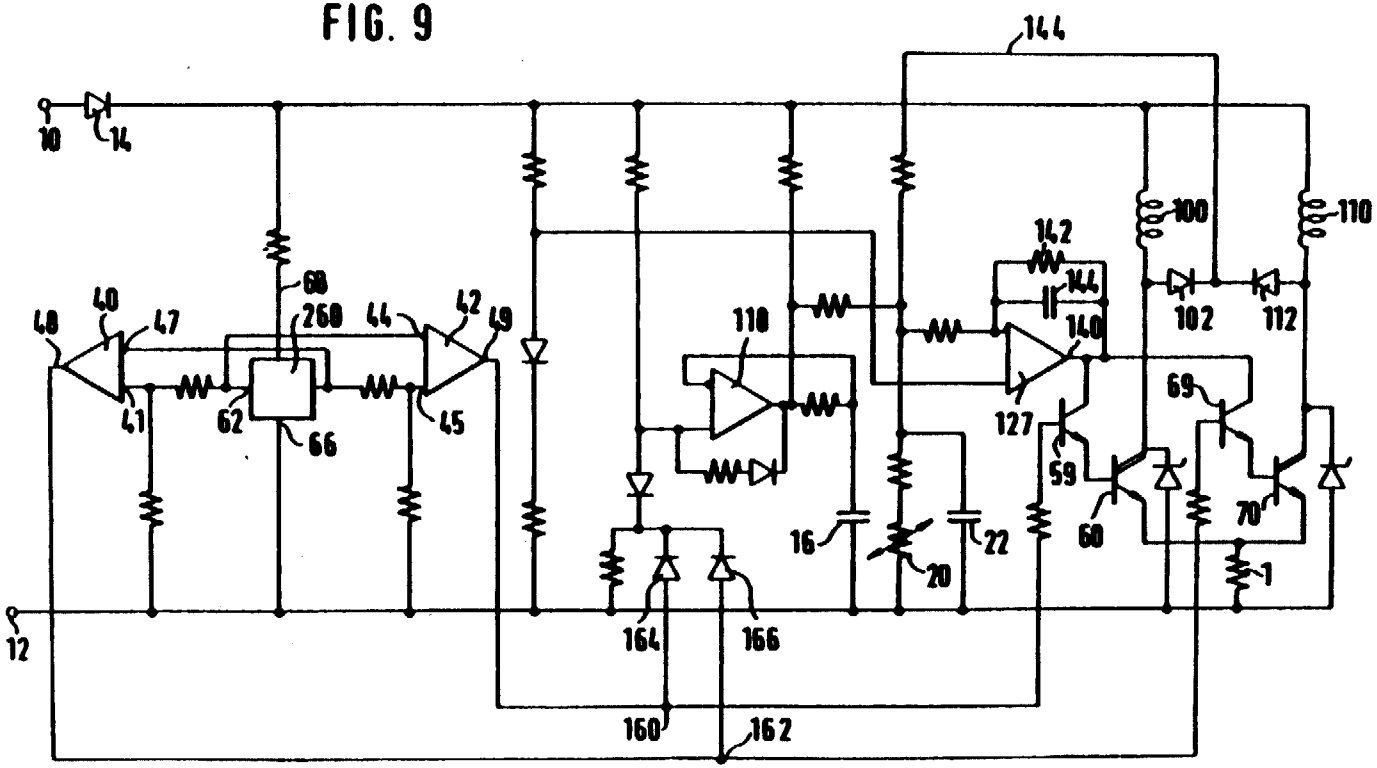
FIG. 9 shows a further modified embodiment of FIG. 8.

While in the preceding embodiments measurement and regulation of the revolution rate as well as the determination of the shape of the current pulse were interdependent, in the last described embodiment and in the embodiments below a pulse shape for the analog regulation phase is derived directly from components provided for this purpose. For example, a sawtooth generator including elements 118 or 119 as shown in FIG. 8 or 9 can be included to generate sawtooth-shaped auxiliary signals from the turnon pulses with the aid of a capacitance, for example capacitance 16 (22). The embodiment according to FIG. 8 here manages with simple components and only one capacitance. It is an object of the invention to integrate the novel circuit in a chip and it is therefore of advantage to keep the number of capacitors low. The circuit according to FIG. 9 includes, like the circuit according to FIG. 8, taps 160 and 162 at the leads from output 48 to transistor 70 and from output 49 to transistor 60. The pulse-shaped voltage is present via diodes 164 and 166 directly at a transistor 119 (FIG. 8) or at a further circuit configured as shown in FIG. 9 and including an operational amplifier 118. The resulting signal shape is present at the inverting input of operational amplifier 127.

Figure 10:
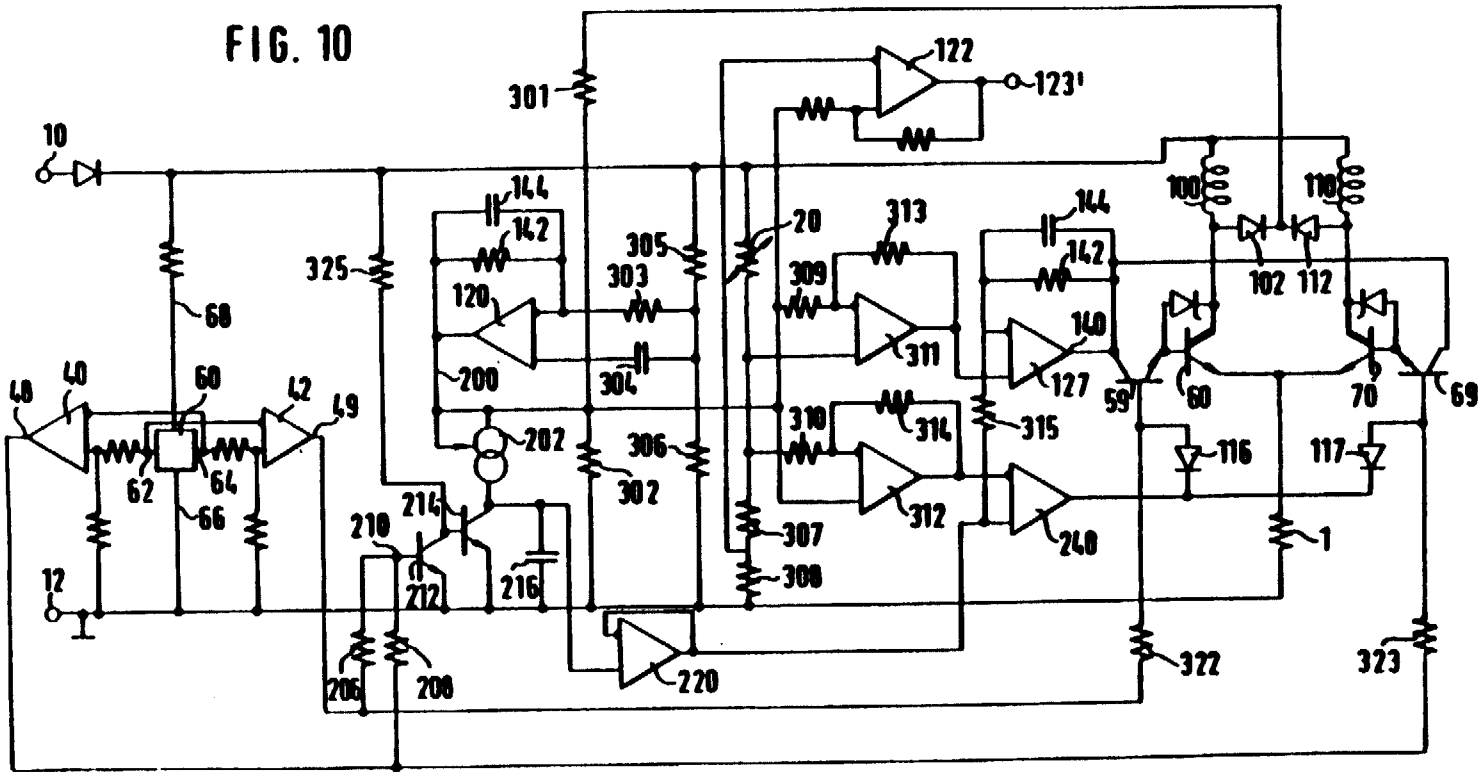
FIG. 10 shows a further modified embodiment of an inserted sawtooth generator.

In a basic circuit shown in FIG. 10, measurement of the revolution rate by means of induced voltage is substantially separated from pulse shaping. The induced voltage is smoothed even better. However, at the same time, the generation of a turn-on pause and of an edge ramp along which analog regulation takes place are derived by means of a sawtooth generator. Via resistors 206 and 208, a signal voltage is available at point 210 which is merely interrupted in a pulsating form by the turn-on pauses. From this signal, a sawtooth signal is derived with the aid of a single capacitor 216 downstream of transistors 212 and 214. Following the remaining vertical signal voltage drop at the beginning of each switching pause, an edge which rises linearly to the full voltage is generated after a pause of a self-regulating duration, and thus a ramp is generated along which the analog regulation can be effected during the turn-on pause as a function of the signal obtained from a comparison of the desired value with the actual value. The given values can be varied by changing voltage source 202. The actual value is supplied through output 200. The signal provided with the ramp is included in the control circuit via operational amplifiers 220 and 240 in such a manner that it is possible to position the current pulse and set its turnoff ramp slope so as to avoid power losses.

As can be seen in the circuit diagram of FIG. 10, two diodes 102, 112 are used again to couple out, as a measure of the revolution rate, the counter-emf induced in stator windings 100, 110 which do not carry current. The counter-emf is fed via a resistor 301 to intermediate amplifier stage 120 which acts as a lowpass filter because of capacitor 144. Intermediate amplifier 120 controls controlled current source 202 to charge capacitor 216, the latter being discharged at regular intervals by transistors 212 and 214. To discharge capacitor 216 it is necessary for transistor 214 to be conductive temporarily. This is effected with auxiliary pulses present at circuit point 210.

The auxiliary pulses are generated in the following manner. Hall generator 260 furnishes its voltage to two comparators 40 and 42 at whose outputs rectangular signals appear which are shifted in phase by 180° and whose high states are somewhat shorter than their low states so that summation of these signals by means of resistors 206 and 208 produces short-term low pulses at point 210 during each commutation. This causes transistor 212 to be briefly turned off and enables a base current to flow for transistor 214 and a series resistor 325. A sawtooth voltage whose amplitude is almost independent of the revolution rate appears across capacitor 216 since the loading current intensity of this capacitor is adapted proportionally to the time available between two commutation pulses. The signal, proportional to the revolution rate, obtained at output 200 of amplifier 120 is supplied for a desired value/actual value comparison. The voltage of a voltage divider including resistors 307 and 308, which voltage is temperature dependent by way of thermistor 20, serves as the desired value. The center point voltage of this voltage divider is fed to the non-inverting input of an amplifier 311 and, via a series resistor 310, to the inverting input of an amplifier 312. The respective other inputs of the amplifiers receive the signal proportional to the revolution rate from output 200.

In this way, a potential is generated at the output of amplifier 311 which grows with increasing temperature and decreasing revolution rate and at amplifier 312 a potential is generated which decreases with increasing temperature and decreasing revolution rate. These potentials are fed to the first inputs of amplifiers 127 and 240 at whose second inputs the sawtooth signal of impedance converter 220 is present.

Amplifier 127 is connected as linear amplifier, for which purpose resistor 315 and resistor 142 are provided. Auxiliary capacitor 144 attenuates the amplifier.

A ramp-shaped signal appears at output 140 of amplifier 127, which signal behaves in dependence on the temperature and on the revolution rate in such a manner that the average potential at output 140 increases with increasing temperature and with decreasing revolution rate, respectively. This signal has the ramp signal of the output of impedance converter 220 superposed on it so that with increasing temperature and with decreasing revolution rate, respectively, the end stage circuit is caused to turn off later in accordance with a ramp function.

Amplifier 240 is connected as comparator. It compares the output potential of amplifier 312 with the sawtooth signal of sawtooth generator 220. A change in potential at the output of amplifier 312 causes a shift in the switching point of comparator amplifier 240 in the sense that with increasing revolution rate and with decreasing temperature, respectively, the output of amplifier 240 remains at the low state for a longer period of time, thus keeping the end stage circuit turned off for a longer period of time before it is able to turn on. Thus a pause proportional to the revolution rate and inversely proportional to the temperature is introduced after the commutation.

In addition to measuring the revolution rate for regulation purposes, a second number of revolutions measurement is made, for which comparator 122 is provided. The latter has a lower voltage value as its desired value which is generated by means of resistors 307 and 308, i.e. this comparator 122 reacts at its output 123' if a second desired value is not reached, which value can be set arbitarily and serves as alarm threshold.

The circuit as a whole has the characteristic that, in dependence on temperature and on the momentary revolution rate, end stage transistors 60, 70 are not turned on in a first time interval, i.e. the turn-on is delayed as indicated by the temperature and the revolution rate controller. Then, end stage transistors 60, 70 are turned on for a certain period of time. The turn-on duration also depends on the temperature and the revolution rate. In a third time interval, end stage transistors 60, 70 are turned off according to a given ramp function, with end stage transistors 60, 70 being used as analog elements and a fourth time interval during which the other end stage transitor is able to turn on remains until the next commutation.

I claim:

1. Driver circuit for a collectorless direct current motor including a permanent magnet rotor having at least two poles and at least one stator winding, comprising:

a driver circuit end stage connected to the stator winding for temporarily operating as a switch, a sensor for detecting a position of the rotor, said sensor producing sensor signals which are representative of a commutation phase, a control siganl, said control signal being supplied to said driver circuit end stage during each said commutation phase, said control signal causing a ramp-shaped current curve to arise as a function of time in the stator winding, said driver circuit end having a linkage circuit which is controlled by said control signal and by said sensor signals of said sensor, said linkage circuit producing an end stage control signal whose duration is variable and is less than the duration of a respective one of said sensor signals, said driver circuit end stage including at least one semiconductor element which operates during said commutation phase for a first period of time as a switch and for a second period of time as an analog amplifier, current in said semiconductor element being relatively constant during said first period of time and changing according to a predetermined ramp function during said second period of time.

2. Driver circuit according to claim 1, wherein said linkage circuit includes switching transistors whose switching states are controlled by comparators which are connected with the outputs of a Hall generator.

3. Driver circuit according to claim 1, wherein said linkage circuit is connected with an output of a pulse width shaper including a comparison amplifier circuit having a first input which is connected to an output of a ramp generator and having a second input which is connected with a revolution rate setting circuit.

4. Driver circuit according to claim 3, [a] *said* ramp generator furnishes a delta voltage as an output signal for said pulse width shaper.

5. Driver circuit according to claim 3, said revolution rate setting circuit is connected with an output of a revolution rate sensor for forming a closed control circuit.

6. A driver circuit as claimed in claim 1, wherein a plurality of semiconductor elements are included in said driver circuit *end stage*, each one of said plurality of semiconductor elements operating during a different portion of said commutation phase for a respective first period of time as a switch and for a respective second period of time as an analog amplifier, current in each said semiconductor element being relatively constant during said first period of time and changing according to a ramp function during said second period of time.

7. Collector less direct current motor for driving a fan comprising:

a stator having at least one stator winding;

a permanent magnet rotor having at least two poles and being disposed in the field of said at least one stator winding, said at least one stator winding being supplied with an operating voltage by a circuit, said circuit having a position sensing means for detecting a position of said permanent magnet rotor to determine a commutation phase thereof, at least one semiconductor element supplying current to said stator winding, a temperature sensing means for detecting temperature of an air stream drawn by the fan, and a control means for controlling said at least one semiconductor element during said commutation phase based upon the temperature sensed by said temperature sensing means, said at least one semiconductor element included in said circuit being controlled by said control means to operate as a switch for supplying a relatively constant current over a part of the commutation phase and as an analog amplifier element over another part of the commutation phase, said at least one semiconductor element, during a period of time [where in] *wherein* a reduction in revolution rate of said permanent magnet rotor occurs, operating initially as a switch and thereafter operating temporarily as an analog amplifier, current in said at least one semiconductor element being reduced during said period of time according to a predetermined ramp function.

8. A collectorless direct current motor according to claim 7, wherein, near a maximum revolution rate of said permanent magnet rotor, said control means regulates said revolution rate predominantly by varying a turn-on duration of current to said at least one stator winding during said commutation phase and, in a lower revolution rate range, regulating said revolution rate additionally by varying the amplitude of the motor current.

9. A collectorless direct current motor according to claim 8, wherein a temperature dependent safety element turns off said operating voltage after a settable time period upon occurrence of an overload condition.

10. A collectorless direct current motor according to claim 8, further comprising a first comparison means for comparing a desired revolution rate value with an actual revolution rate value for regulating said revolution rate, an alarm signaling means, and a second comparison means for comparing the desired revolution rate value with the actual revolution rate value for monitoring said revolution rate with respect to a given limit value at which an alarm signal is initiated by said alarm [signal] *signaling* means.

11. A collectorless direct current motor according to claim 10, wherein said given limit value for monitoring said revolution rate is also used for initiating a stop order.

12. A collectorless direct current motor according to claim 10, further comprises a plurality of stator windings, wherein voltage induced by said permanent magnet rotor in one of said plurality of stator windings through which no current flows is used to measure said actual revolution rate value.

13. A collectorless direct c current motor according to claim 8 further comprising a first comparison means for comparing a desired revolution rate value with an actual revolution rate value for regulating said revolution rate, and a second comparison means for comparing the desired revolution rate value with the actual revolution rate value and initiating a stop order for cutting off the current upon reaching a given limit value.

14. A collectorless direct current motor according to claim 8, wherein said control means derives a signal for regulation of said revolution rate is based upon a signal received from said temperature sensing means.

15. A collectorless direct current motor according to claim 14, wherein said operating voltage for driving said at least one stator winding is used as a command variable for regulation of said revolution rate.

16. A collectorless direct current motor according to claim 14, wherein a signal derived from the temperature sensing means and said operating voltage are command variables for regulation of said revolution rate.

17. A collectorless direct current motor according to claim 8, wherein, when said revolution rate is reduced to less than 50% of said maximum revolution rate, a switching duration of said at least one semiconductor element in a switch mode is reduced until said at least one semiconductor element operates purely as said analog amplifier element.

18. A collectorless direct current motor according to claim 7, wherein said revolution rate is controlled by varying a transition interval between switch operation and subsequent analog operation of said semiconductor elements during said commutation phase.

19. A collectorless direct current motor according to claim 7, wherein, upon reduction of said revolution rate, an instant at which said semiconductor element is turned on is delayed with respect to a turn-on time given by said position sensing means.

20. A collectorless direct current motor according to claim 7, wherein control of motor output and revolution rate are effected in an open control chain by an externally given physical value.

21. A collectorless direct current motor according to claim 7, wherein control of motor output and revolution rate are effected in a closed control circuit by an externally given physical value.

22. A collectorless direct current motor according to claim 7, wherein control of motor output and revolution rate are effected by an essentially analog circuit and necessary time functions are generated by RC members.

23. A collectorless direct current motor according to claim 7, wherein a plurality of semiconductor elements are included in said circuit, each one of said plurality of semiconductor elements operating during a different portion of said commutation phase for a respective first period of time as a switch and for a respective second period of time as an analog amplifier, current in each said semiconductor element being relatively constant during said first period of time and changing according to a ramp function during said second period of time.

*24. A collectorless direct current motor for driving a fan, comprising*

*a stator having at least one stator winding,*

*a permanent magnet rotor having at least two poles and being disposed in the field of the at least one stator winding, and*

*circuit means for supplying the at least one stator winding with an operating current, the circuit means having a position sensing means for detecting a position of the permanent magnet rotor to determine a commutation phase for the operating current supplied by the circuit means to the stator winding,*

*the circuit means also including*

*at least one semiconductor element supplying current to the stator winding,*

*temperature sensing means for detecting a temperature influenced by the fan,*

*control means for controlling the at least one semiconductor element during the commutation phase based*

*upon the temperature sensed by the temperature sensing means,*

*the at least one semiconductor element being controlled by the control means to operate in a switched mode for supplying the current to the stator winding over a part of the commutation phase, which is less than all of the commutation phase, and*

*the at least one semiconductor element and the control means being coupled to the temperature sensing means and operating to switch the current on only once in a commutation phase in variable dependence upon the detected temperature to change the revolution rate of the motor.*

*25. The collectorless direct current motor for driving a fan, as claimed in claim 24, wherein*

*the position sensing means comprises means for providing a commutation phase signal and the temperature sensing means provides a detected temperature signal, the motor further including*

*means for comparing the commutation phase signal to the detected temperature signal to apply to the at least one semiconductor element a turn-on pulse which becomes longer the higher the detected temperature is.*

*26. The collectorless direct current motor for driving a fan, as claimed in claim 25, wherein*

*the means for comparing the commutation phase signal to the detected temperature signal comprises*

*a capacitor and*

*a means for discharging the capacitor at the start of each commutation phase, and*

*the temperature sensing means comprises a thermistor influenced by the airstream of the fan for determining the charging current of the capacitor after the discharge has occurred to generate the detected temperature signal.*

*27. The collectorless direct current motor for driving a fan, as claimed in claim 25, wherein*

*the means for comparing the commutation phase signal to the detected temperature signal comprises a capacitor and means for discharging the capacitor at the start of each commutation phase, and*

*the temperature sensing means having a connection to the capacitor to supply charging current thereto and having a thermistor influenced by the airstream of the fan that provides the detected temperature signal and via the connection to the capacitor determines the charging current of the capacitor after discharge has occurred to provide a temperature-dependent, pulse width modulated signal to the at least one semiconductor element.*

*28. A collectorless direct current motor for driving a fan, comprising*

*a stator having at least one stator winding,*

*a permanent magnet rotor having at least two poles and being disposed in the field of the at least one stator winding, and*

*circuit means for supplying the at least one stator winding with an operating current, the circuit means having a position sensing means for detecting a position of the permanent magnet rotor to determine a commutation phase for the operating current supplied by the circuit means to the stator winding,*

*the circuit means also including*

*at least one semiconductor element supplying current to the stator winding,*

*temperature sensing means for detecting a temperature influenced by the fan,*

*control means for controlling the at least one semiconductor element during the commutation phase based upon the temperature sensed by the temperature sensing means,*

*the at least one semiconductor element being controlled by the control means to produce an at least partly analog signal determining the current to the stator winding, the current being supplied over a part of the commutation phase, which is less than all of the commutation phase, and*

*the at least one semiconductor element and the control means being coupled to the temperature sensing means and operating to supply the current continuously only once in a commutation phase in variable dependence upon the detected temperature to change the revolution rate of the motor.*

*29. The collectorless direct current motor for driving a fan, as claimed in claim 28, wherein*

*the control means controls the at least one semiconductor element to operate essentially in an analog mode for supplying the current to the stator winding, the control means providing a rounded signal to facilitate low noise operation of the motor.*

*30. The collectorless direct current motor for driving a fan, as claimed in claim 28, wherein*

*the control means comprises means for starting the charging of a capacitor at the start of the commutation phase to produce a first signal,*

*the temperature sensing means comprises means for controlling the rate of charging of the capacitor, and means, including means for filtering and integrating the first signal to produce a rounded signal, for initiating conduction in the one semiconductor element after the start of the commutation phase.*

*31. The collectorless direct current motor for driving a fan, as claimed in claim 30, in which the means for initiating conduction in the one semiconductor element after the start of the commutation phase comprises*

*a control element having a control electrode and a controlled signal path,*

*means for coupling the control electrode to the position sensing means to receive a signal having steps at the beginning and end of the determined commutation phase,*

*means for coupling the controlled signal path to the filtering and integrating means to determine the passage of the rounded signal to the one semiconductor element, and*

*the filtering and integrating means and the one semiconductor element together providing a current-starting signal value which the rounded signal reaches significantly after the start of the commutation phase.*

*32. In a fan, a driver circuit for a collectorless direct current motor including a permanent magnet rotor having at least two poles and at least one stator winding, comprising:*

*a driver circuit end stage connected to the stator winding for temporarily operating as a switch,*

*a sensor for detecting a position of the rotor, said sensor producing sensor signals which are representative of a commutation phase,*

*a ramp generator responding to said sensor signals and producing a ramp-shaped control signal,*

*said control signal being supplied to said driver circuit end stage during each said commutation phase, said control signal causing a current curve as a function of time in the stator winding, and*

*a sensor for detecting a temperature influenced by the fan, said sensor producing a temperature-dependent signal,*

*said driver circuit end stage having a linkage circuit which is controlled by said control signal, by said sensor signals and by said temperature-dependent signal, said linkage circuit producing an end stage control signal whose duration is variable and is less than the duration of a respective one of said sensor signals.*

*33. In a fan, a driver circuit for a collectorless direct current motor including a permanent magnet rotor having at least two poles and at least one stator winding, comprising:*

*a driver circuit end stage connected to the stator winding for temporarily operating as a switch,*

*a sensor for detecting a position of the rotor, said sensor producing sensor signals which are representative of a commutation phase,*

*a ramp generator responding to said sensor signals and producing a ramp-shaped control signal,*

*said control signal being supplied to said driver circuit end stage during each said commutation phase, said control signal causing a current curve as a function of time in the stator winding, and*

*means for providing, separate from said control signal, a command signal for said driver circuit end stage,*

*said driver circuit end stage having a linkage circuit which is controlled by said control signal, by said sensor signals and by said command signal, said linkage circuit producing an end stage control signal whose duration is variable and is less than the duration of a respective one of said sensor signals.*

*34. In a fan, a driver circuit for a collectorless direct current motor as claimed in claim 33,*

*further including temperature sensing means for supplying to an input node of the linkage circuit as said command signal a temperature signal responsive to a temperature influenced by the fan,*

*wherein the linkage circuit is controlled by said control signal, by said sensor signals, and by said temperature signal to apply to the driver circuit end stage a turn-on pulse which becomes longer the higher the detected temperature is.*

*35. In a fan, a driver circuit for a collectorless direct current motor as claimed in claim 34, wherein*

*the linkage circuit comprises a capacitor and means for discharging the capacitor at the start of each commutation phase, and*

*the temperature sensing means is connected to the capacitor to supply charging current thereto, the temperature sensing means comprising a thermistor influenced by the airstream of the fan for determining the charging current of the capacitor after discharge has occurred to generate a temperature-dependent, pulse width modulated signal.*

*36. In a fan, a driver circuit for a collectorless direct current motor as claimed in claim 33, wherein*

*the linkage circuit is controlled by said control signal, by said sensor signals and by said command signal to turn on as a switch with respect to the stator winding and thereafter to provide an effect upon the stator winding to promote low-noise motor operation.*

*37. In a fan, a driver circuit for a collectorless direct current motor as claimed in claim 36, wherein*

*the linkage circuit includes*

*means responsive to at least said control signal and said command signal for providing a filtered signal, and*

*an analog switch responsive to the filtered signal.*

*38. In a fan, a driver circuit for a collectorless direct current motor as claimed in claim 37, wherein*

*the means for providing a filtered signal includes an integrator.*

*39. In a fan, a driver circuit for a collectorless direct current motor as claimed in claim 36, wherein*

*the command signal providing means includes temperature sensing means for supplying to said driver circuit end stage as said command signal a temperature signal responsive to a temperature influenced by the fan,*

*wherein the linkage circuit is controlled by said control signal, by said sensor signals, and by said temperature signal to apply to the driver circuit end stage a turn-on pulse which becomes longer the higher the detected temperature is and has a magnitude dependent upon the detected temperature.*

* * * * *